Oct. 20, 1936. J. A. SPENCER 2,057,853
THERMOSTAT
Filed April 22, 1935  2 Sheets-Sheet 1
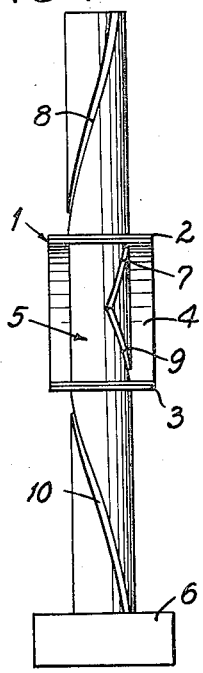
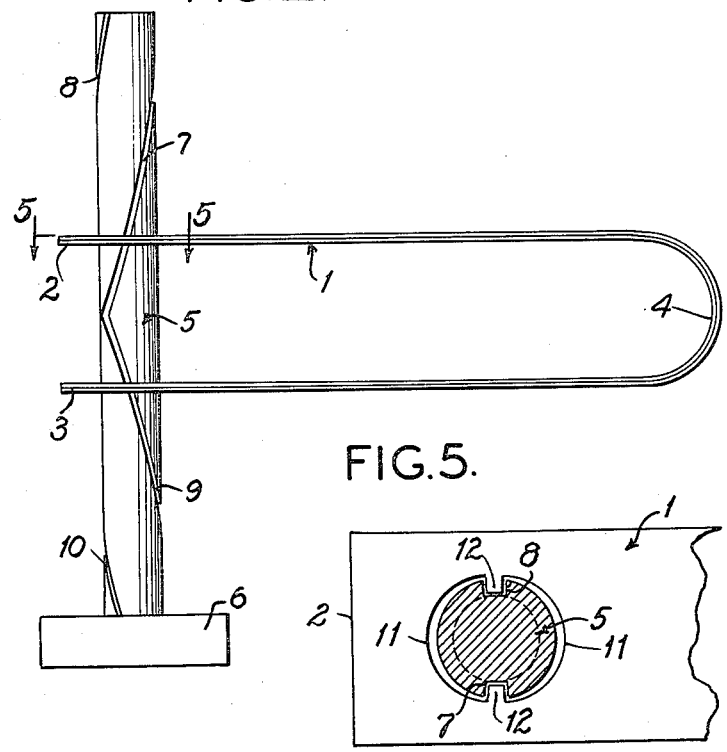
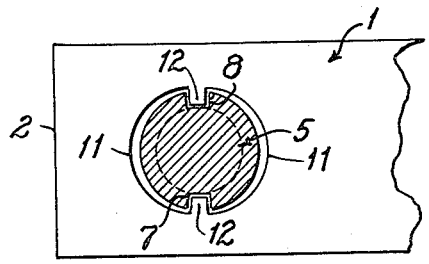
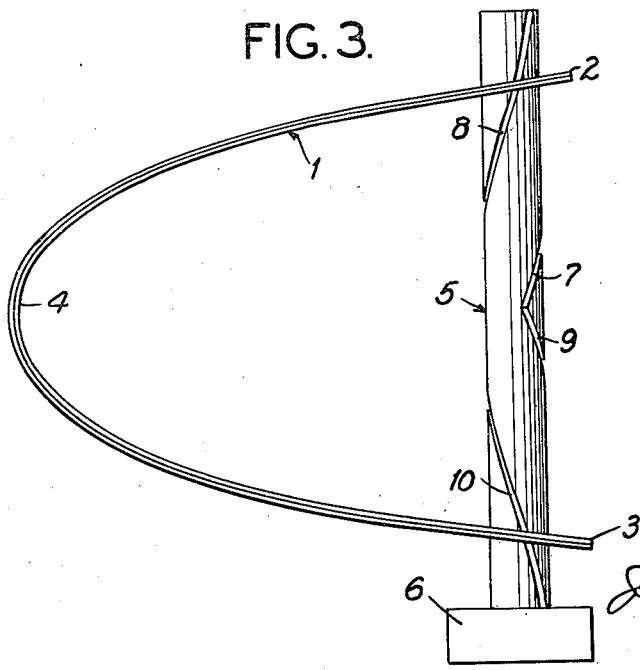
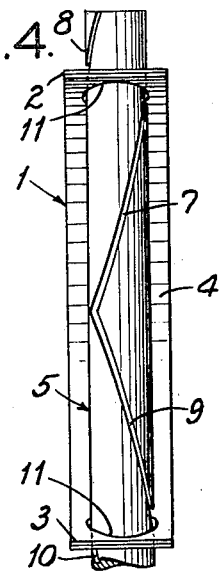
John A. Spencer,
Inventor,
Delos F. Haynes,
Attorney.

Oct. 20, 1936.  J. A. SPENCER  2,057,853
THERMOSTAT
Filed April 22, 1935   2 Sheets-Sheet 2
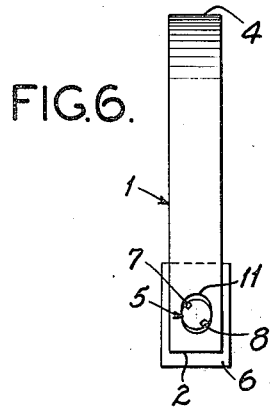
FIG.6.
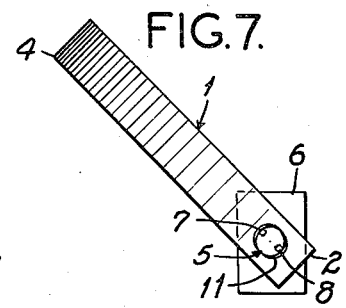
FIG.7.
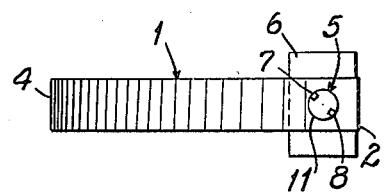
FIG.8.
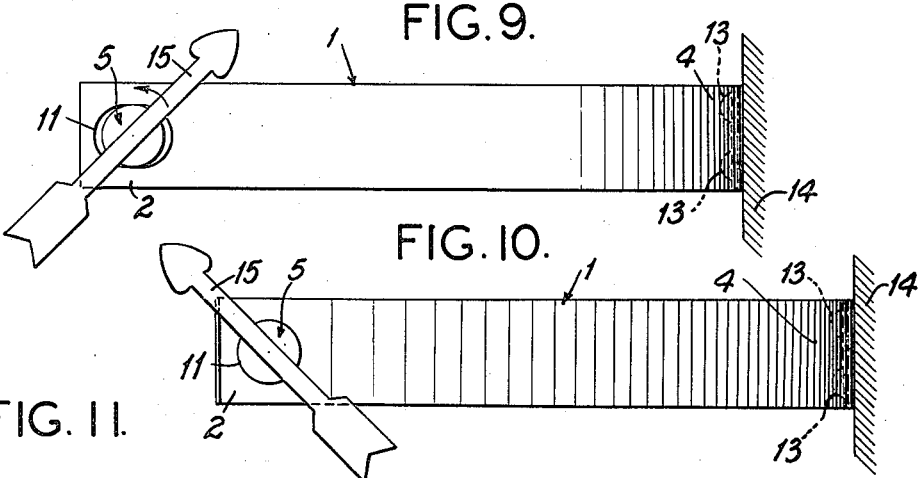
FIG.9.
FIG.10.
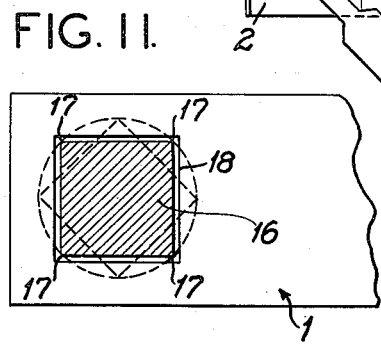
FIG.11.
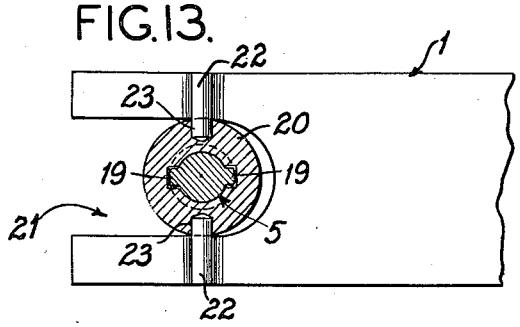
FIG.13.
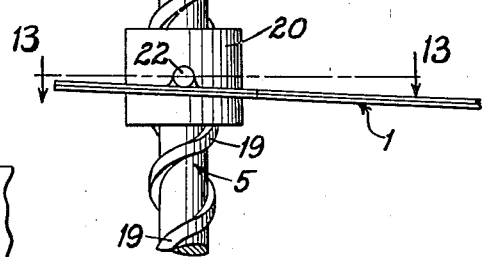
FIG.12.
John A. Spencer,
Inventor,
Delos F. Haynes,
Attorney.

Patented Oct. 20, 1936

2,057,853

UNITED STATES PATENT OFFICE 2,057,853

THERMOSTAT

John A. Spencer, Newtonville, Mass., assignor to General Plate Company, Attleboro, Mass., a corporation of Massachusetts Application April 22, 1935, Serial No. 17,685

1 Claim. (Cl. 297—15)

This invention relates to thermostats, and with regard to certain more specific features, to thermostatic devices adapted for performing a variety of useful control functions.

Among the several objects of the invention may be noted the provision of a thermostat of the class described in which the deflection of a composite thermostat member in response to temperature variation is translated directly and effectively into a relative rotary movement; the provision of a thermostat of the class described wherein the composite thermostat member, in addition to producing a rotary movement, likewise automatically moves itself through a considerable amplitude in response to temperature changes; and the provision of a thermostat of the class described which is simple in construction and reliable in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which are illustrated several of various possible embodiments of the invention, Fig. 1 is a front elevation of a thermostat embodying the present invention;

Fig. 2 is a side elevation of the thermostat of Fig. 1;

Fig. 3 is a front elevation of the thermostat of Fig. 1, after it has changed its position in response to temperature change;

Fig. 4 is a side elevation of the thermostat in its Fig. 3 position;

Fig. 5 is a horizontal cross-section taken substantially along line 5—5 of Fig. 2;

Fig. 6 is a top plan view of the thermostat in its Fig. 1 position;

Fig. 7 is a top plan view of the thermostat intermediate its Fig. 1 and its Fig. 3 positions;

Fig. 8 is a top plan view of the thermostat in its Fig. 3 position;

Fig. 9 is a side elevation of a second embodiment of the invention;

Fig. 10 is a side elevation of the embodiment of Fig. 9, in a different temperature condition;

Fig. 11 is a view similar to Fig. 5, illustrating an alternative embodiment;

Fig. 12 is a fragmentary view illustrating an alternative embodiment; and,

Fig. 13 is a horizontal cross-section taken substantially along line 13—13 of Fig. 12.

Similar reference characters indicate corresponding parts throughout the several views of the drawings.

Referring now more particularly to Figures 1 and 2, numeral 1 indicates a strip of composite thermostatic material bent back upon itself in a substantially U-shape, providing free ends 2 and 3 and a closed end 4. The composite thermostatic metal of which the strip 1 is made may be the customary bimetal, such as that formed of high expansion nickel-steel and invar layers securely adhered together, or it may be formed of a plurality of layers as disclosed in Vannevar Bush Patent No. 1,870,235, dated August 9, 1932.

An inherent and well known function of this type of composite thermostatic material is its faculty, under changing temperature conditions, to vary its curvature, or undergo deflection. This faculty is made use of in a novel manner in the present invention.

Numeral 5 indicates a controlled element, which, in the present embodiment, comprises a cylindrical post supported on a base 6. The post 5 has machined therein a pair of helical grooves or threads 7, 8, 9, and 10. Grooves 7 and 8 are 180° apart, and each progresses in the same direction from the center of post 5 upwardly to its upper end. Grooves 9 and 10 are similarly 180° apart and each progresses in the same direction from the middle of post 5 downwardly to the bottom of the post. A particular feature is that the grooves 7 and 8, on the one hand, progress in the opposite direction from the grooves 9 and 10, on the other hand. That is, if the grooves 7 and 8 correspond to right-hand threads, the grooves 9 and 10 then correspond to left-hand threads.

In the embodiment as illustrated in Figures 1 and 2, the lead of the grooves, 7, 8, 9, and 10 is very great. Under certain conditions, it is more advantageous to have a lesser lead, as will be apparent hereinafter.

The free ends 2 and 3 of the composite thermostatic metal strip 1 are punched or otherwise provided with elliptical openings 11 (see Fig. 5). The opening 11 includes inwardly projecting ears 12 arranged on diametrically opposite sides. The ears 12 are of a sufficient size to fit loosely in the grooves 7, 8, 9, and 10 on the post 5.

The thermostat is assembled in the manner shown in Figures 1 and 2. In assembly, it is arranged that the thermostatic metal strip 1, at the desired normal temperature, be shaped as illustrated without being under tension. Ordinarily this will be a relatively low temperature. Such being the case, the innermost layer of the thermostatic metal strip is the layer having the higher temperature coefficient of linear expansion, while the outermost layer is the layer having a lower temperature coefficient of linear expansion. This arrangement results, when the temperature commences to increase, in a tendency on the part of the strip 1 to alter its shape by separating its free ends 2 and 3. Because of the engagement of ears 12 with the grooves 7, 8, 9, and 10, however, the change cannot be effected without said ears sliding in said grooves, and when this sliding takes place, the strip 1 is forced to rotate about the post 5. Figures 6, 7, and 8 illustrate this rotation from above. When the free ends 2 and 3 have been separated to the extent necessary to bring the shape to that shown in Fig. 3, with the pitch of grooves shown, it will be found that the strip 1 has rotated through an angle of 90°, this position being illustrated in Figures 3, 4, and 8.

It will be seen that this rotative motion is achieved only by reason of the opposite direction of the grooves or threads 7 and 8, as compared with the grooves or threads 9 and 10.

The opening 11 is made elliptical, so that when the strip assumed the position shown in Fig. 3, for example, its slope relative to the post 5 will not cause the strip to bind, as would be the case if the opening 11 were a close-fitting circular opening. It will of course be obvious that the opening 11 may be made circular, if the circular diameter is sufficient to achieve the same looseness of fit as is provided for by the elliptical shape that is preferred.

The utility of the embodiment as thus provided will readily be apparent. For example, a controlled device, such as an electrical switch, may be separated by the opening and closing movements of the free ends 2 and 3 of the thermostatic strip 1. The closed or rounded end 4 of the thermostatic strip 1 may then be arranged to project into a heated region. If this is the case, it will be seen that as the thermostatic strip 1 reaches its higher temperature, it automatically moves itself out of the heated region, and at the same time, by separation of the ends 2 and 3, achieves a control function. Cooling of the thermostatic strip 1 causes it to move back into the heated region, and perform the reverse control operation.

The embodiment as thus far described considers the thermostatic strip 1 as the relatively movable element, and the post 5 as the relatively stationary element. This arrangement may be reversed, as is illustrated in the embodiment shown in Figures 9 and 10. Here the thermostatic strip 1 is secured, at its closed end 4, as by bolts 13, to a relatively fixed base 14. The post 5 is of the same construction as that shown in the prior embodiment, with the exception that the base 6 is dispensed with. In order to illustrate the rotary movement obtained, a signal arrow 15 is provided, rigidly attached to one end of the post 5.

Upon change of temperature with this embodiment of the invention, the post 5 rotates on its own axis, carrying the signal arrow 15, for example, to the position shown in Fig. 10. The reactions producing this rotation will be apparent without detailed description.

This embodiment of the invention likewise readily finds use as a control. The arrow 15, for example, may be mounted in juxtaposition to a scale with suitable indicia thereon, whereupon the thermostat will function as a signal or thermometer. Or, the arrow 15 may be replaced by a mercury tube or similar switch operable by rotation, in which event the thermostat constitutes a temperature-responsive electrical switch. Valves or shutters operable by rotative movement can similarly be attached to and controlled by rotation of the post 5.

It will be apparent that the grooved or threaded post 5 is but one embodiment of the various types of posts that can be used in connection with the present invention. Fig. 11, for example, illustrates the substitution of the helically grooved post 5 by a post 16 of square cross-section, which is twisted longitudinally so that the edges 17 are positioned in a helical manner. The thermostatic strip 1 is then provided with a square hole 18 loosely fitting on the square post 16. This embodiment, in effect, constitutes a screw device with four parallel threads.

While the square cross-section of the post 16 shown is square, by way of example, it will be apparent that any polygonal cross-section is readily adaptable to the present invention. It is, of course, essential that regardless of the cross-section of the post member, it be a right-hand threaded portion which one end of the U-shape thermostatic strip engages, and a left-hand threaded portion which the other end of the thermostatic strip engages.

Figures 12 and 13 illustrate an improved method of effecting the joint or juncture between the thermostatic strip 1 and the post 5. The post 5 is here shown as having outwardly extending helical projections or threads 19, replacing the grooves such as 7 in the Fig. 1 embodiment. Slidable on, and engaging the threads 19, is a nut 20. The end of the thermostatic strip 1 is provided with a notch 21, which receives the nut 20. Trunnions 22 are welded to the thermostatic strip 1, and project into sideward openings 23 in the nut 20. With this construction, it will be seen that the angle of the thermostatic strip 1 may change with respect to the post 5, without occasioning any binding or the like. By reason of the provision of a well-machined nut 20, the turning action of the strip 1 or of the post 5, depending on which undergoes the relative movement, is smoother than with the simpler embodiment heretofore described. One such nut arrangement is provided for each end of the thermostatic strip 1, of course.

It will be seen that the lead of the helical thread or grooves or edge, as the case may be, determines the angle of rotation which the device will undergo in response to a predetermined linear operation of the free ends of the thermostatic strip. The greater the lead, the less will be the angular rotation. When the lead is less, as is the case with the Fig. 12 embodiment, a relatively slight amount of linear movement or operation of the free ends will result in a relatively greater angular movement. Thus, by calculation of the constants involved, it will readily be apparent that any desired angular movement can be provided from the available linear movement.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

A thermostat comprising a U-shaped strip of composite thermostatic material and relatively rotatable means, a pair of nuts slidably mounted on said means, each of said nuts engaging a free end of the thermostatic strip in an angularly adjustable manner, the region of said means engaging one nut being provided with helical guiding means progressing in one direction, and the region of said means engaging the other nut being provided with helical guiding means progressing in the opposite direction.

JOHN A. SPENCER.